(12) United States Patent
Shimokawa et al.

(10) Patent No.: US 11,852,167 B2
(45) Date of Patent: Dec. 26, 2023

(54) MOTOR AND AIR CONDITIONER USING THE SAME

(71) Applicant: Mitsubishi Electric Corporation, Tokyo (JP)

(72) Inventors: Takaya Shimokawa, Tokyo (JP); Hiroki Aso, Tokyo (JP); Naoki Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/623,788

(22) PCT Filed: Aug. 5, 2019

(86) PCT No.: PCT/JP2019/030649
§ 371 (c)(1),
(2) Date: Dec. 29, 2021

(87) PCT Pub. No.: WO2021/024338
PCT Pub. Date: Feb. 11, 2021

(65) Prior Publication Data
US 2022/0243740 A1 Aug. 4, 2022

(51) Int. Cl.
*F04D 29/58* (2006.01)
*F04D 25/06* (2006.01)
(Continued)

(52) U.S. Cl.
CPC ......... *F04D 29/5806* (2013.01); *F04D 25/06* (2013.01); *F04D 29/054* (2013.01);
(Continued)

(58) Field of Classification Search
CPC .... F04D 29/053; F04D 29/054; F04D 29/281; F04D 29/5806; F04D 29/329; H02K 7/03; H02K 9/06; H02K 9/227
(Continued)

(56) References Cited

U.S. PATENT DOCUMENTS 1,957,307 A * 5/1934 Von Ohlsen ............ F04D 25/10
415/125
3,064,506 A * 11/1962 Arvid ...................... B21C 37/26
29/890.048
(Continued)

FOREIGN PATENT DOCUMENTS

CN 103208895 A * 7/2013 ............ F04C 15/008
GB 2566837 A 3/2019
(Continued)

OTHER PUBLICATIONS

Irie et al., CN 103208895 Machine Translation—(7623788_Jan. 31, 2023_CN_103208895_A_M.pdf), (Jul. 2013) (Year: 2013).*
(Continued)

*Primary Examiner* — Kenneth J Hansen
(74) *Attorney, Agent, or Firm* — POSZ LAW GROUP, PLC (57) ABSTRACT

A motor has a sufficient heat dissipation function even when a non-magnetic material having low thermal conductivity is used for a shaft of a motor using a consequent pole rotor. A motor includes: a stator; a consequent pole rotor including a rotor core and a magnet; a casing housing the stator and the rotor; a shaft including a non-magnetic material and fixed to the rotor; and heat dissipation blades that are a first heat dissipation promoting means that rotates with the shaft. This promotes heat dissipation through a heat dissipation path from an inside of the motor through the shaft, preventing problems due to overheat in the motor.

17 Claims, 5 Drawing Sheets

(51) Int. Cl.
  *F04D 29/054* (2006.01)
  *F04D 29/26* (2006.01)
  *F04D 29/28* (2006.01)
  *F04D 29/60* (2006.01)

(52) U.S. Cl.
  CPC ......... *F04D 29/263* (2013.01); *F04D 29/281* (2013.01); *F04D 29/5853* (2013.01); *F04D 29/601* (2013.01)

(58) Field of Classification Search
  USPC .......... 416/93 R, 182, 185, 189, 244 R, 175, 416/203, 201 R, 201 A, 198 A; 417/366, 417/368
  See application file for complete search history.

(56) References Cited

U.S. PATENT DOCUMENTS

| | | | | |
|---|---|---|---|---|
| 4,670,677 | A * | 6/1987 | Snider | H02K 9/06 416/182 |
| 2011/0109176 | A1* | 5/2011 | Yoshimura | H02K 9/227 310/64 |
| 2013/0183175 | A1 | 7/2013 | Rie et al. | |
| 2014/0145564 | A1 | 5/2014 | Taniguchi et al. | |
| 2018/0372110 | A1 | 12/2018 | Moser et al. | |
| 2019/0173337 | A1 | 6/2019 | Shimokawa et al. | |
| 2020/0227981 | A1 | 7/2020 | Oketani | |

FOREIGN PATENT DOCUMENTS

| | | | |
|---|---|---|---|
| JP | S56-065199 U | 6/1981 | |
| JP | S60-160067 U | 10/1985 | |
| JP | H0J-203554 A | 9/1991 | |
| JP | H04-368448 A | 12/1992 | |
| JP | H05-231388 A | 9/1993 | |
| JP | H06-346885 A | 12/1994 | |
| JP | H11-107994 A | 4/1999 | |
| JP | 2001-008411 A | 1/2001 | |
| JP | 2001008411 A * | 1/2001 | |
| JP | 2009-030488 A | 2/2009 | |
| JP | 2010-126325 A | 6/2010 | |
| JP | 2013-017276 A | 1/2013 | |
| JP | 2013-169136 A | 8/2013 | |
| JP | 2013-252032 A | 12/2013 | |
| JP | 2017-099079 A | 6/2017 | |
| JP | 2018-148632 A | 9/2018 | |
| JP | 2020022277 A * | 2/2020 | ............ H02K 3/34 |
| WO | 2018/011979 A1 | 1/2018 | |
| WO | 2018/233208 A1 | 12/2018 | |
| WO | 2019/012574 A1 | 1/2019 | |

OTHER PUBLICATIONS

Office Action dated Sep. 20, 2022 in connection with counterpart Japanese Patent Application No. 2021-538555 (and English machine translation).
Extended European Search Report dated Jul. 27, 2022 for the corresponding European Patent Application No. 19940887.3.
International Search Report of the International Searching Authority dated Oct. 15, 2019 issued in the corresponding International Application No. PCT/JP2019/030649 (and English translation attached).
Office Action dated Nov. 3, 2022 in connection with counterpart Australian Patent Application No. 2019460693.
Office Action dated Mar. 14, 2023 in connection with counterpart Japanese Patent Application No. 2021-538555 (and English machine translation).
Office Action dated Feb. 27, 2023 in connection with counterpart Australian Patent Application No. 2019460693.
Office Action dated Jul. 12, 2023 in connection with counterpart Indian Patent Application No. 202227004598 (and English translation).
Office Action dated Sep. 21, 2023 issued in corresponding CN patent application No. 201980098387.X (and English translation).
Office Action dated Aug. 1, 2023 in connection with counterpart Japanese Patent Application No. 2021-538555 (and English machine translation).

* cited by examiner

MOTOR AND AIR CONDITIONER USING THE SAME

CROSS REFERENCE TO RELATED APPLICATION

This application is a U.S. national stage application of PCT/JP2019/030649 filed on Aug. 5, 2019, the contents of which are incorporated herein by reference.

TECHNICAL FIELD

The present invention relates to a motor including a consequent pole rotor, and an air conditioner including the same.

BACKGROUND ART

In recent years, motors using high-performance rare earth magnets have been employed in many electrical devices. Rare earth magnets contain rare elements and thus are costly, and have high risk in terms of securing resources. Thus, it is required to reduce magnet usage as much as possible.

As a way to reduce magnet usage, it is conceivable to form a motor by using a consequent pole rotor. In a consequent pole rotor, magnet magnetic poles by magnets and salient poles formed in a rotor core not by magnets are circumferentially alternately arranged, and thus it is possible to form a rotor while reducing the number of magnets to half the usual number.

On the other hand, in a consequent pole rotor, since problems may be caused by a shaft being magnetized by leakage magnetic flux, a non-magnetic material may be used as the material of the shaft. Non-magnetic materials generally have lower thermal conductivity than magnetic materials, and there is a problem in that heat generated in the motor is difficult to dissipate to the outside through the shaft.

As a way to improve heat dissipation characteristics from a motor, there is known a cooling device that generates cooling air flowing along a side surface of a casing with a cooling fan mounted to a shaft projecting outside the casing (see, e.g., Patent Literature 1).

CITATION LIST

Patent Literature

Patent Literature 1: Japanese Patent Application Publication No. H6-346885

SUMMARY OF INVENTION

Technical Problem

However, it is difficult to sufficiently cool a rotor located near a center of a motor only by flowing air to an outer surface of a casing as in the prior art document. In particular, when the casing is molded from a resin that is an insulating material, even the heat dissipation from the casing is insufficient, and a rise in temperature in the motor may reduce the efficiency or output of the motor.

The present invention has been made to solve the problems as described above, and provides a motor having a sufficient heat dissipation function even when a non-magnetic material having low thermal conductivity is used for a shaft of a consequent pole rotor.

Solution to Problem

To achieve the above object, a motor according to the present invention includes: a stator; a consequent pole rotor including a rotor core and a magnet; a casing housing the stator and the rotor; a shaft including a non-magnetic material and fixed to the rotor; and a first heat dissipation promoting means that rotates with the shaft.

Advantageous Effects of Invention

The motor according to the present invention continuously generates airflow along a shaft 8 with a first heat dissipation promoting means provided to an impeller 21 connected to the shaft 8, and thus promotes heat dissipation through a heat dissipation path from an inside of the motor through the shaft 8 even when a consequent pole rotor is employed and the shaft made of a non-magnetic material is used. Thereby, it is possible to prevent problems due to overheat in the motor 1.

DESCRIPTION OF EMBODIMENTS

Motors using consequent pole rotors and air conditioners according to embodiments of the present invention will be described below in detail with reference to the drawings. The present invention is not limited by the embodiments.

First Embodiment

Figure 1:
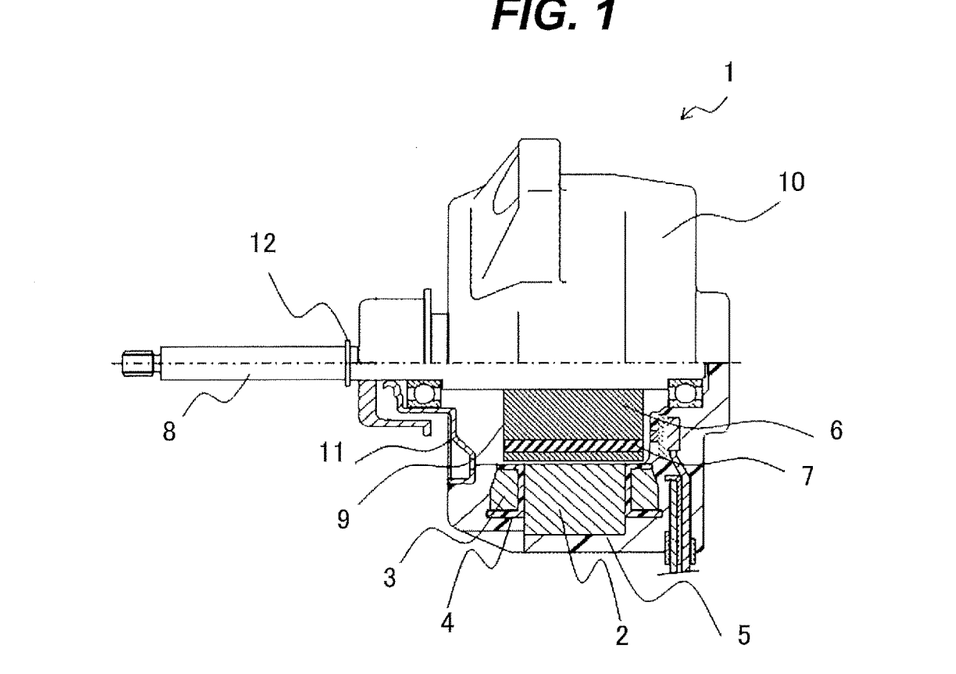
FIG. 1 is an axial sectional view of a motor using a consequent pole rotor according to a first embodiment of the present invention.

FIG. 1 is an axial sectional view of a motor including a consequent pole rotor according to a first embodiment of the present invention. The motor 1 illustrated in FIG. 1 includes an annular stator 5 including a stator core 2 and coils 3, and a rotor 9 including a rotor core 6, magnets 7, and a shaft 8. Also, a casing 10 is formed by molding a resin material around an outer periphery of the stator 5, and the rotor 9 is supported inside the stator 5 by a bracket 11 attached to an axial end face of the casing 10. Also, a disk-shaped heat dissipation fin 12 is connected to the shaft 8, which projects outside the casing 10.

Figure 2:
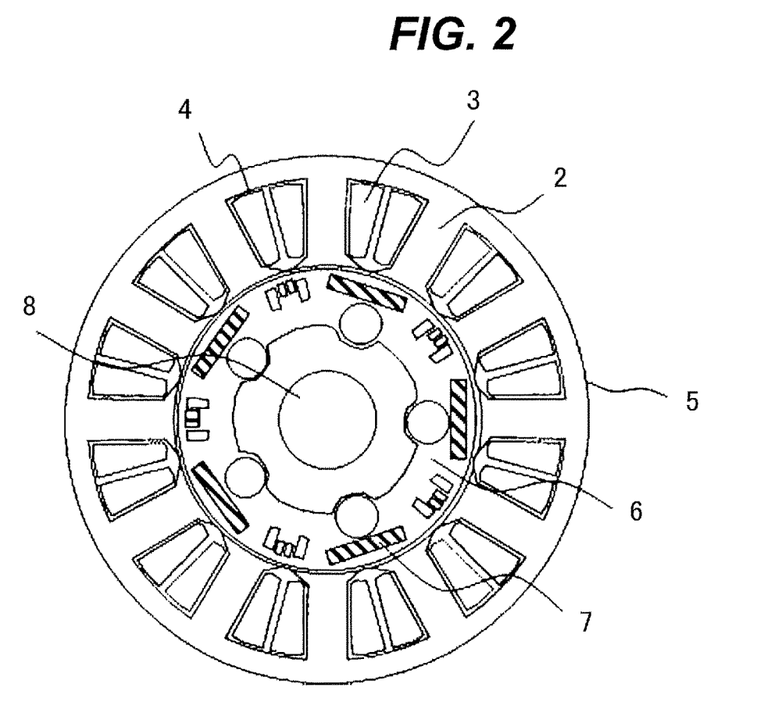
FIG. 2 is a radial sectional view of the consequent pole rotor and a stator according to the first embodiment of the present invention.

FIG. 2 is a radial sectional view of the rotor 9 and stator 5 of the motor 1. The stator 5 has a shape with multiple cores projecting from an outer periphery side of the stator core 2 toward a center of the stator core 2, and is formed by stacking multiple electromagnetic steel sheets that are magnetic and have thicknesses of 0.2 mm to 0.5 mm. Conductive wire composed primarily of copper or aluminum is wound around the multiple projecting cores to form the coils 3. An insulator 4 ensures insulation between the stator core 2 and the coils 3.

The insulator 4 is formed integrally with the stator core 2, or is produced separately from the stator core 2 and then fitted to the stator core 2. The insulator 4 is formed by an insulating resin, such as polybutylene telephthalate (PBT), polyphenylene sulfide (PPS), liquid crystal polymer (LCP), or polyethylene terephthalate (PET), or an insulating film having a thickness of 0.035 mm to 0.4 mm.

The rotor 9 is a consequent pole rotor of an embedded magnet type, and is located with a slight gap between the rotor 9 and an inner periphery of the stator 5. The rotor core 6, which is circular, is formed by stacking multiple electromagnetic steel sheets having thicknesses of 0.2 mm to 0.5 mm. In a peripheral portion thereof, the magnets 7, the number of which is, for example, 5, are inserted at regular intervals. As the magnets 7, rare earth magnets composed primarily of neodymium (Nd) or samarium (Sm) or ferrite magnets composed primarily of iron (Fe) are used. Also, the shaft 8, which is made of SUS 304, which is a non-magnetic material, is fixed to a center of the rotor core 6 by press fitting, caulking, shrink fitting of the rotor core, resin integral molding between the rotation shaft and the rotor core, or other methods. The material of the shaft is not limited to this, and may be other austenitic stainless steels or materials other than ferrous materials.

Figure 3:
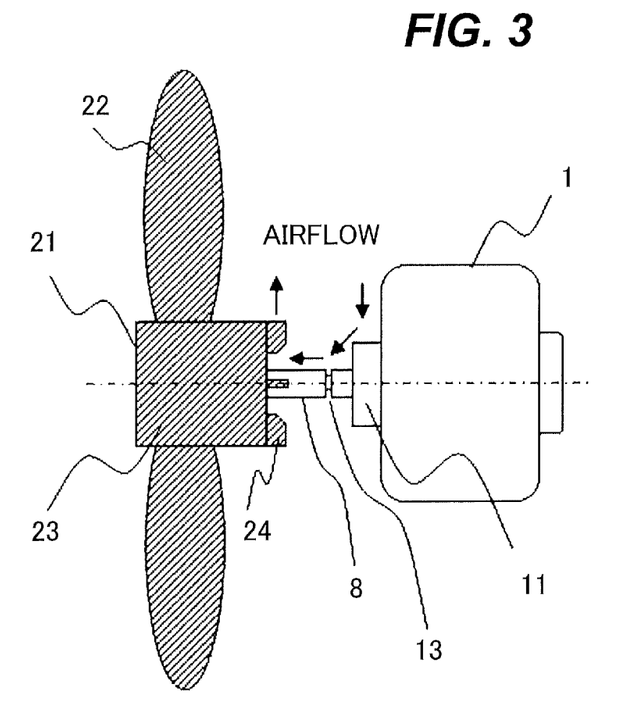
FIG. 3 is a configuration diagram illustrating an example in which the motor of the first embodiment of the present invention is used as a blower.

FIG. 3 is a configuration diagram illustrating an example of a state in which the motor 1 of the embodiment of the present invention is actually used. In the first embodiment of the present invention, an impeller 21, which is a rotating body, is connected to the shaft 8, which projects from the motor 1, thereby forming an axial flow blower. Multiple vanes 22, a connection 23, and blower blades 24 are integrally formed of a resin material, such as polypropylene, to form the impeller 21.

The blower blades 24, which are a first heat dissipation promoting means, are formed by multiple plates projecting from an end face of the connection 23, which is formed in a cylindrical shape, on a side facing the motor 1 toward the motor 1. In the example illustrated in FIG. 3, the blower blades 24 are formed by four flat plates provided radially from a shaft center. However, the blade shapes and the number of blades are not limited to this. The blower blades 24 may be inclined forward or backward with respect to the rotation direction, instead of being provided parallel to radial directions, and the number of blades may be increased. Also, it is possible to improve the blowing efficiency by forming the blades to have cross sections having streamlined shapes instead of flat plate shapes.

Next, effects of the first embodiment will be described.

The blower blades 24 functions as a centrifugal blower with rotation of the impeller 21, and generates airflow outward from the vicinity of the shaft 8. Accordingly, airflow is generated in the directions of the arrows illustrated in FIG. 3 in a space between the motor 1 and the impeller 21, and thus airflow along a surface of the shaft 8, which is hot due to heat generation in the motor, continuously occurs, promoting heat dissipation from the shaft 8 to the external space.

In general, a rotating body like the impeller 21 generates airflow in only centrifugal directions or an axial flow direction without generating airflow toward the shaft 8, and thus moves little air near the shaft 8. Although the blower blades 24 also blow air in directions away from the shaft 8, they cause air between the impeller 21 and the bracket 11 to flow outward, thereby indirectly generating airflow toward the shaft 8.

Thus, even when the shaft 8 is made of a non-magnetic material having low thermal conductivity, it is possible to prevent overheat in the casing 10 by virtue of sufficient heat dissipation by the blower blades 24. Also, since the impeller 21 and blower blades 24 are integrally formed, neither additional parts nor assembly processing are needed, and it is possible to obtain a great heat dissipation promoting effect without increasing the material cost or processing cost.

Figure 4:
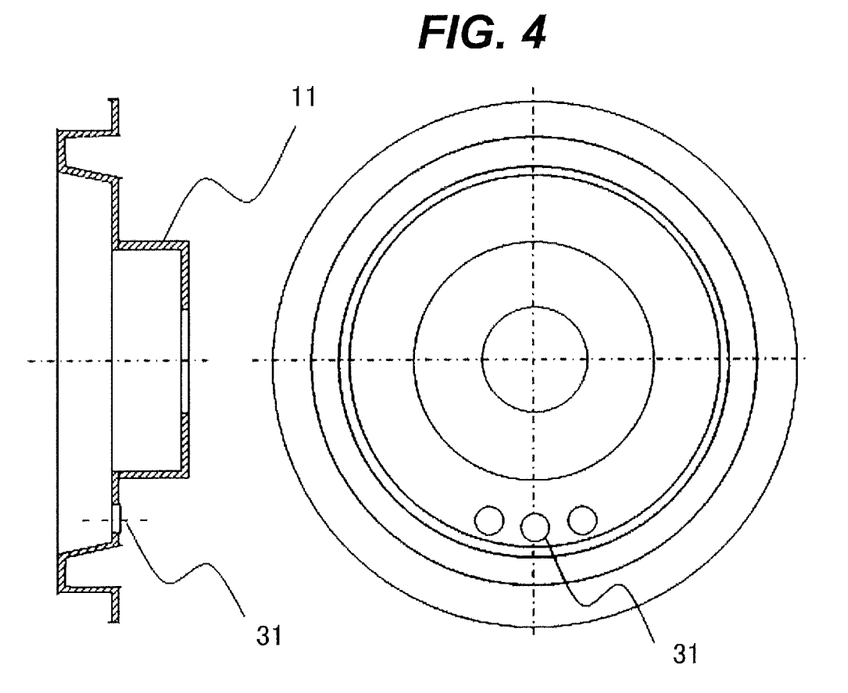
FIG. 4 is a sectional view and a plan view illustrating a structure of a bracket of the motor of the first embodiment of the present invention.

FIG. 4 is a sectional view and a plan view of the bracket 11 of the first embodiment of the present invention as illustrated in FIG. 1. It is a member made of a metallic material, such as a steel sheet, and having, in its center, a hole through which the shaft 8 passes, and is fixed to an opening side of the casing 10 by being press fitted thereto. The way of connecting the casing 10 and the bracket 11 is not limited to this, and may be screw fastening, adhesion, or other ways.

At least one through hole 31 is formed in the bracket 11 such that an internal space of the casing 10 in which the rotor core 6 is housed and the external space communicate with each other through the through hole 31. Thus, it is possible to improve the heat dissipation performance by feeding part of the airflow generated by the blower blades 24 directly to the rotor core 6 housed in the casing 10. Also, since the bracket 11 is made of a metallic material having a higher thermal conductivity than the mold resin, it becomes hot due to heat generation by the stator 5 and rotor 9, improving the heat dissipation performance from the surface of the bracket 11 to the external space.

Also, a groove portion 13 formed in the shaft 8 increases the surface area of the shaft 8 and converts the airflow generated by the blower blades 24 into turbulent flow, thereby serving as a second heat dissipation promoting means to increase a convective heat transfer effect.

Figure 5:
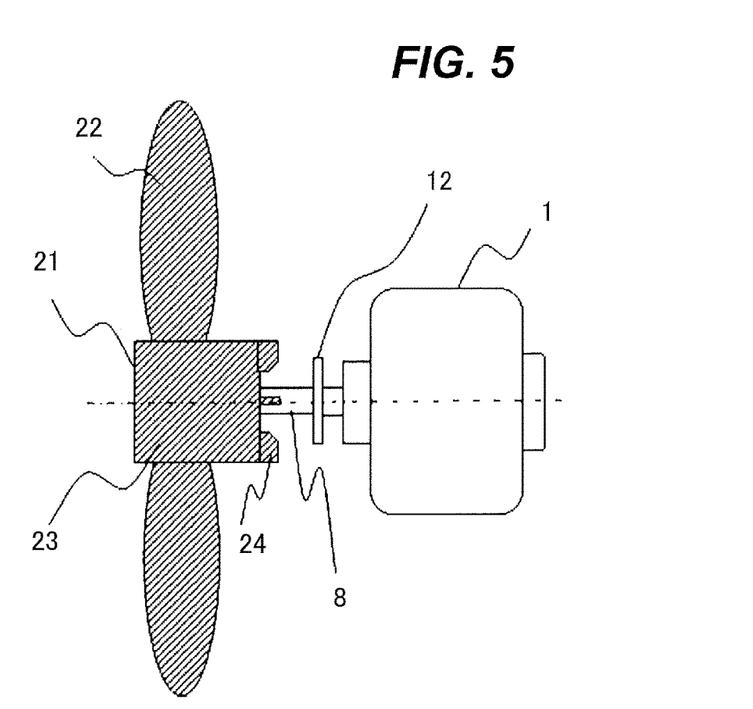
FIG. 5 is a configuration diagram illustrating a modification in which the motor of the first embodiment of the present invention is used as a blower.

While the second heat dissipation promoting means has been described as being the groove portion 13, a modification of the second heat dissipation promoting means will be described below with reference to FIGS. 5 and 6. FIG. 5 is a configuration diagram of the blower with the heat dissipation fin 12 connected to the groove portion 13. The heat dissipation fin 12 is disposed between the impeller 21 and the motor 1.

Figure 6:
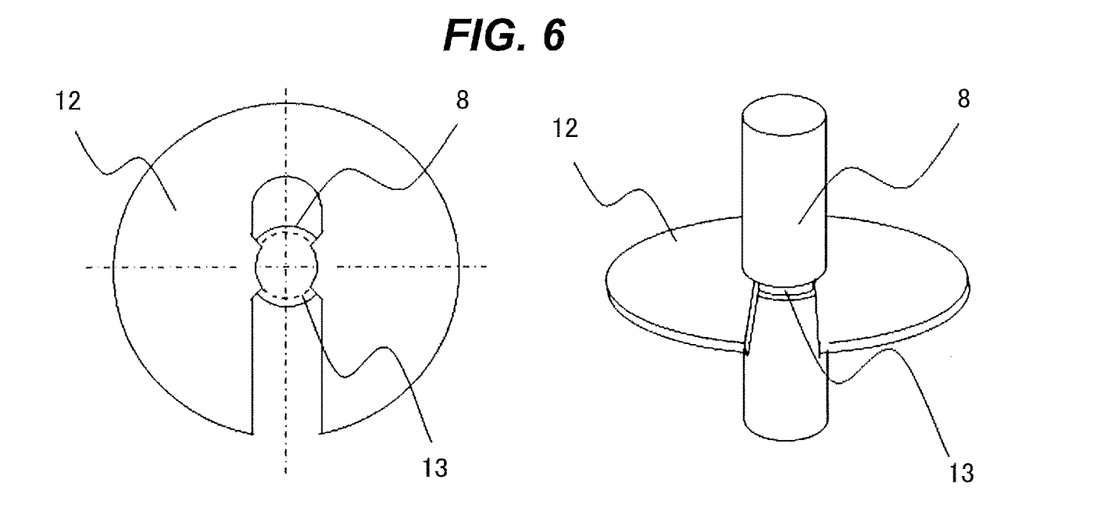
FIG. 6 is a plan view and a perspective view illustrating a shape and an installation state of a heat dissipation fin of the motor of the first embodiment of the present invention.

FIG. 6 is a plan view of the heat dissipation fin 12 as illustrated in FIG. 5, and a perspective view illustrating a state in which the heat dissipation fin 12 is connected to the shaft 8. The disk-shaped heat dissipation fin 12, which is the second heat dissipation promoting means, is made of, for example, S45C, which is a steel material having a higher thermal conductivity than the shaft 8, and is fitted in the groove portion 13 provided in the shaft 8. A diameter of a hole at a central portion of the heat dissipation fin 12 is slightly smaller than a diameter of the groove portion 13, and the heat dissipation fin 12 is fitted tightly due to elastic deformation of the heat dissipation fin 12. Thereby, the heat dissipation fin 12 is in close contact with the shaft 8 at the contact surface with the shaft 8 so as not to prevent heat transfer, and heat in the motor 1 efficiently transfers to the heat dissipation fin 12 through the shaft 8. The heat dissipation fin 12 may be made of copper or aluminum having a higher thermal conductivity than steel materials.

As above, in the first embodiment, when a blower is formed by connecting the impeller 21 to the motor 1, since the blower blades 24 are provided to the connection 23, it is possible to generate airflow along the shaft 8. Thereby, heat dissipation from the shaft 8 is promoted, and even when a non-magnetic material having low thermal conductivity is used for the shaft 8, it is possible to avoid problems due to overheat by sufficiently cooling the inside of the motor 1.

Also, since the blower blades 24 are formed integrally with the impeller 21 and connection 23, no additional parts for cooling the shaft 8 are needed, and it is possible to reduce the material cost and processing cost.

Also, since the groove portion 13 is formed in the shaft 8, it is possible to improve the heat dissipation performance from the shaft 8 by increasing the heat dissipation area and converting the airflow generated by the blower blades 24 into turbulent flow. In another aspect, the heat dissipation fin 12 having a higher thermal conductivity than the shaft 8 may be fitted in the groove portion 13. With such a configuration, the surface area for heat dissipation from the shaft 8 is further increased, and it is possible to improve the heat dissipation performance.

Also, since the bracket 11 includes the through hole 31 such that the internal space and external space of the casing 10 communicate with each other through the through hole 31, it is possible to improve the heat dissipation performance in the motor 1 by feeding airflow generated by the blower blades 24 directly to the rotor core 6. Also, since the bracket 11 is made of a metallic material having a higher thermal conductivity than the mold resin, the heat dissipation performance from the surface of the bracket 11 is also improved.

Although the first embodiment describes a case where the blower is formed by connecting the impeller 21 to the motor 1, this is not mandatory, and it may be applied to mechanical equipment, such as hermetic refrigerant compressors or machine tools.

Second Embodiment

While the first embodiment describes a case where the connection 23 is formed to be solid, a second embodiment describes a case of using a relatively large impeller in which the connection 23 is formed in a hollow cylindrical shape for the purpose of making the wall thickness substantially uniform.

Figure 7:
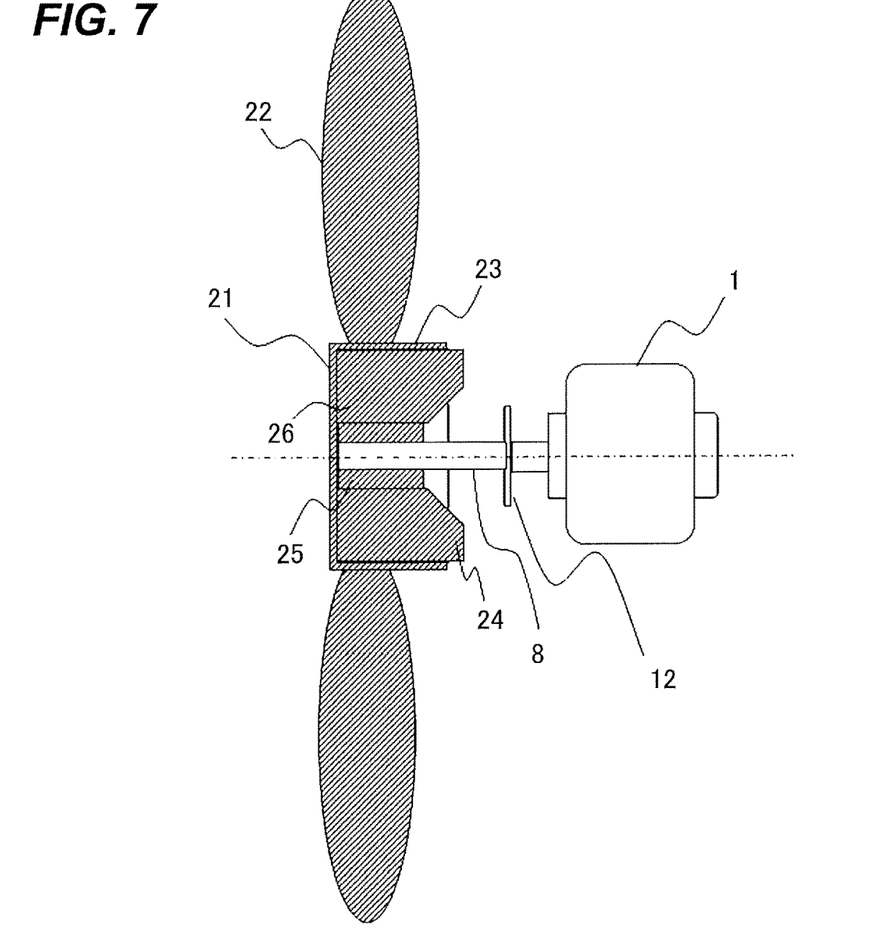
FIG. 7 is a configuration diagram illustrating an example in which a motor of a second embodiment of the present invention is used as a blower.

FIG. 7 is a sectional view illustrating an actual use example when the connection 23 of the first embodiment of the present invention has a hollow cylindrical shape. The connection 23 has a hollow cylindrical shape with an opening on the motor 1 side, and multiple vanes 22 are provided to an outer periphery side cylindrical portion of the connection 23, thereby forming an impeller 21. Also, multiple reinforcement ribs 26, which are radially arranged, are formed between a center side cylindrical portion 25, in which the shaft 8 is fitted, and the outer periphery side cylindrical portion.

Figure 8:
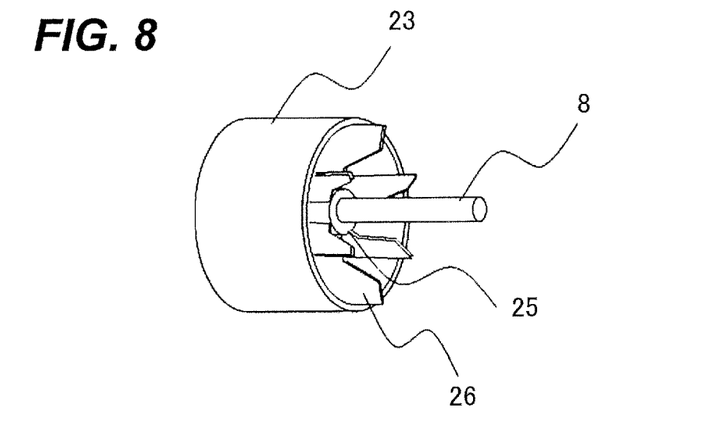
FIG. 8 is a perspective view illustrating a shape of a connection 23 between the motor and an impeller in the second embodiment of the present invention.

FIG. 8 illustrates a perspective view of the connection 23 of the impeller 21 connected to the motor 1 according to this embodiment. The reinforcement ribs 26 project from the connection 23 toward the motor 1 to form blower blades 24, and has a function of blowing air near the shaft 8 outward by centrifugal force, thereby generating airflow along the shaft 8.

As above, in the second embodiment, since the reinforcement ribs 26 of the connection 23 formed in a hollow cylindrical shape project toward the motor 1 to form the blower blades 24, it is possible to promote heat dissipation from the shaft 8 by generating airflow near the shaft 8 and prevent overheat in the motor 1.

Also, since the blower blades 24 are formed by making the reinforcement ribs 26 simply project axially, it is possible to simply provide the blower blades 24 almost without changing the shape of the impeller 21.

Third Embodiment

While the first and second embodiments describe cases where the first heat dissipation promoting means is provided to the connection 23, a third embodiment describes an example where the blower blades 24 are provided as the first heat dissipation promoting means to the heat dissipation fin 12.

Figure 9:
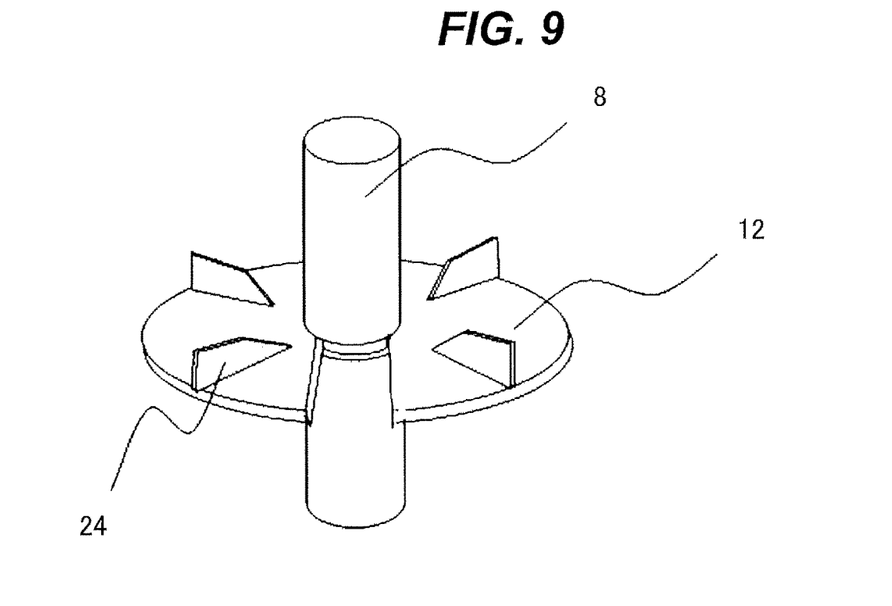
FIG. 9 is a perspective view illustrating shapes of a heat dissipation fin and blower blades of a motor of a third embodiment of the present invention.

FIG. 9 is a view illustrating a modification of the position where the blower blades 24 of the first embodiment of the present invention are formed. The blower blades 24 are formed on the heat dissipation fin 12 fitted in the groove portion 13 formed in the shaft 8 such that the blower blades 24 are cut and raised from a surface of the heat dissipation fin 12. As the shaft 8 rotates, the heat dissipation fin 12 also rotates, the blower blades 24 generate airflow flowing outward from the vicinity of the groove portion 13 in which the heat dissipation fin 12 is fitted. This airflow indirectly forms airflow flowing toward the groove portion 13 along the surfaces of the shaft 8 and heat dissipation fin 12, and thus it is possible to promote heat dissipation from the shaft 8 more effectively.

As above, in the third embodiment, since the blower blades 24 are formed integrally with the heat dissipation fin 12, airflow is generated toward a portion where the heat dissipation fin 12 and shaft 8 are fitted to each other, and it is possible to promote heat dissipation from the shaft 8 more effectively.

Also, it is possible to combine the first heat dissipation member described in the third embodiment and the first heat dissipation member described in the first or second embodiment.

Fourth Embodiment

Figure 10:
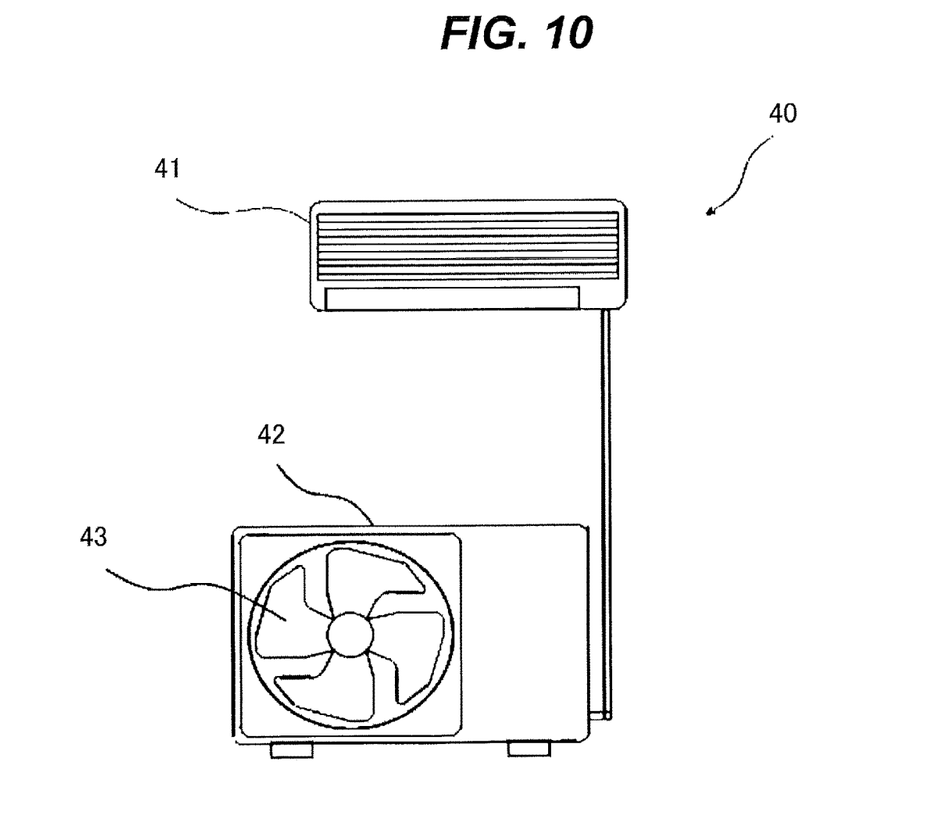
FIG. 10 is a view illustrating an example of a configuration of an air conditioner using the motor of any one of the first to third embodiments of the present invention.

FIG. 10 is a view illustrating an example of a configuration of an air conditioner according to any one of the first to third embodiments of the present invention. The air conditioner 40 includes an indoor unit 41 and an outdoor unit 42 connected to the indoor unit 41. An indoor fan (not illustrated) is installed in the indoor unit 41, and an outdoor fan 43 is installed in the outdoor unit 42. Also, a compressor (not illustrated) is installed in the outdoor unit 42. The motor 1 of any one of the first to third embodiments is used in each of the indoor fan, outdoor fan 43, and compressor.

By using the motor 1 according to the first embodiment as a driving source of each of the indoor fan, outdoor fan 43, and compressor, heat dissipation from the insides of the motors 1 is promoted, preventing reduction in the operating efficiency of the air conditioner 40.

The motor 1 of any one of the first to third embodiments can be installed in electrical equipment other than the air conditioner 40, and also in this case, it is possible to provide the same advantages as the embodiment.

Also, the configurations described in the above embodiments show examples of the content of the present invention, and may be combined with other known techniques, and part of the configurations may be omitted or modified without departing from the gist of the present invention.

REFERENCE SIGNS LIST 1 motor, 2 stator core, 3 coil, 4 insulator, 5 stator, 6 rotor core, 7 magnet, 8 shaft, 9 rotor, 10 casing, 11 bracket, 12 heat dissipation fin, 13 groove portion, 21 impeller, 22 vane, 23 connection, 24 blower blade, 25 center side cylindrical portion, 26 reinforcement rib, 31 through hole, 40 air conditioner, 41 indoor unit, 42 outdoor unit, 43 outdoor fan.

The invention claimed is:

1. A motor comprising:
a stator;
a consequent pole rotor including a rotor core and a magnet;
a casing housing the stator and the rotor;
a shaft comprising a non-magnetic material and fixed to the rotor;
an impeller fixed to the shaft; and
a first heat dissipation promoting means that is fixed to the shaft projecting outside the casing and rotates with the shaft,
wherein the first heat dissipation promoting means is one or more blower blades provided between the impeller and the casing in an axial direction of the shaft, and
wherein the motor is configured so that the blower blades generate airflow outward from a vicinity of the shaft, so that airflow along a surface of the shaft continuously occurs in a direction from the rotor toward the blower blades in a space between the rotor and the blower blades.

2. The motor of claim 1, wherein the blower blades are formed integrally with a connection that fixes the impeller to the shaft.

3. The motor of claim 2, further comprising between the rotor and the connection a second heat dissipation promoting means that is a heat dissipation fin or groove portion that increases a surface area of the shaft.

4. The motor of claim 3, wherein the second heat dissipation promoting means is a groove portion formed between the rotor and the connection.

5. The motor of claim 3, wherein the second heat dissipation promoting means is a heat dissipation fin fitted in a groove portion formed between the rotor and the connection.

6. The motor of claim 2, wherein the blower blades project from an end face of the connection that faces the rotor.

7. The motor of claim 2, wherein the connection is formed in a hollow cylindrical shape, and the blower blades are formed integrally with reinforcement ribs radially disposed in an inside of the connection.

8. The motor of claim 1, further comprising a bracket supporting the shaft, the bracket comprising a metallic material and connected to an end face of the casing.

9. The motor of claim 8, wherein the bracket includes a through hole for allowing a space housing the rotor and an outside of the casing to communicate with each other.

10. The motor of claim 1, further comprising, between the rotor and a connection that fixes a rotating body to the shaft, a second heat dissipation promoting means,
wherein the second heat dissipation promoting means is a heat dissipation fin fitted in a groove portion formed between the rotor and the connection, and
wherein the heat dissipation fin is formed integrally with the blower blades.

11. The motor of claim 1, wherein the casing is formed by a resin material molded around the stator.

12. A motor comprising:
a stator;
a consequent pole rotor including a rotor core and a magnet;
a casing housing the stator and the rotor;
a shaft comprising a non-magnetic material and fixed to the rotor; and
a first heat dissipation promoting means that is fixed to the shaft projecting outside the casing and rotates with the shaft,
wherein the first heat dissipation promoting means is one or more blower blades to generate airflow outward from a vicinity of the shaft,
wherein the blower blades are formed integrally with a connection that fixes a rotating body to the shaft,
wherein the motor further comprises between the rotor and the connection a second heat dissipation promoting means that increases a surface area of the shaft,
wherein the second heat dissipation promoting means is a heat dissipation fin fitted in a groove portion formed between the rotor and the connection, and
wherein the heat dissipation fin comprises a material having a higher thermal conductivity than a material of the shaft.

13. The motor of claim 12, further comprising a bracket supporting the shaft, the bracket comprising a metallic material and connected to an end face of the casing.

14. The motor of claim 13, wherein the bracket includes a through hole for allowing a space housing the rotor and an outside of the casing to communicate with each other.

15. The motor of claim 12, wherein the casing is formed by a resin material molded around the stator.

16. An air conditioner comprising the motor of claim 1.

17. An air conditioner comprising the motor of claim 12.

* * * * *